(12) United States Patent  (10) Patent No.: US 8,352,340 B2
White et al.  (45) Date of Patent: Jan. 8, 2013

(54) METHODS AND SYSTEMS FOR EXERCISING STOCK OPTIONS

(75) Inventors: Elizabeth White, North Bergen, NJ (US); John Furlong, Plandome, NY (US); Landy Tam, Englewood, NJ (US)

(73) Assignee: UBS AG, Zurich (CH)

( * ) Notice: Subject to any disclaimer, the term of this patent is extended or adjusted under 35 U.S.C. 154(b) by 1134 days.

(21) Appl. No.: 11/051,049

(22) Filed: Feb. 4, 2005

(65) Prior Publication Data
US 2005/0192875 A1  Sep. 1, 2005

Related U.S. Application Data

(60) Provisional application No. 60/542,504, filed on Feb. 6, 2004.

(51) Int. Cl.
*G06Q 40/00* (2012.01)
(52) U.S. Cl. ............................. 705/35; 705/37; 705/38
(58) Field of Classification Search .............. 705/35, 705/36 R, 36 T, 37, 38, 39, 50, 500
See application file for complete search history.

(56) References Cited

U.S. PATENT DOCUMENTS

| | | | | |
|---|---|---|---|---|
| 5,426,281 | A * | 6/1995 | Abecassis ..................... | 235/379 |
| 5,671,363 | A * | 9/1997 | Cristofich et al. .............. | 705/37 |
| 6,173,270 | B1 * | 1/2001 | Cristofich et al. .............. | 705/37 |
| 6,269,346 | B1 * | 7/2001 | Cristofich et al. ......... | 705/36 R |
| 6,317,728 | B1 * | 11/2001 | Kane ........................... | 705/36 R |
| 6,629,082 | B1 | 9/2003 | Hambrecht et al. ............ | 705/37 |
| 6,993,511 | B2 * | 1/2006 | Himmelstein ................. | 705/80 |
| 7,092,904 | B1 * | 8/2006 | Understein ..................... | 705/37 |
| 7,158,951 | B2 * | 1/2007 | Stark ................................. | 705/37 |
| 7,337,141 | B2 * | 2/2008 | Sullivan et al. ................. | 705/37 |
| 2001/0047328 | A1 * | 11/2001 | Triola ............................. | 705/39 |
| 2002/0007335 | A1 * | 1/2002 | Millard et al. .................. | 705/37 |
| 2002/0032636 | A1 * | 3/2002 | Shields et al. .................. | 705/37 |
| 2002/0042771 | A1 * | 4/2002 | Shields et al. .................. | 705/37 |
| 2003/0236731 | A1 * | 12/2003 | Landaeta et al. ................ | 705/36 |
| 2004/0030636 | A1 * | 2/2004 | Sommer ......................... | 705/37 |

(Continued)

FOREIGN PATENT DOCUMENTS
WO   WO 03/038568 A2 *  8/2003

OTHER PUBLICATIONS

Stock Options, Raymond James, pp. 6-7, Feb. 2, 2003.*

(Continued)

*Primary Examiner* — Narayanswamy Subramanian
(74) *Attorney, Agent, or Firm* — Pillsbury Winthrop Shaw Pittman LLP (57) ABSTRACT

Methods and corresponding systems are provided for exercising employee stock options between an employee and a company. The stock option exercise generally includes the steps of establishing a plurality of escrow accounts including a company escrow account, a third party escrow account, and an employee escrow account, receiving notice of intent to exercise a stock option from an employee, transferring securities to satisfy the stock option exercise from the company to a company escrow account, transferring property equivalent to a third party purchase price from a third party to the third party escrow account, transferring the notice of intent to exercise a stock option to the employee escrow account, and transferring property held in the plurality of escrow accounts to the employee, the company, and the third party in accordance at least in part with the stock option.

22 Claims, 3 Drawing Sheets

U.S. PATENT DOCUMENTS

| | | | | |
|---|---|---|---|---|
| 2004/0148248 | A1* | 7/2004 | Allen et al. | 705/37 |
| 2005/0114242 | A1* | 5/2005 | Gray et al. | 705/35 |
| 2007/0112658 | A1* | 5/2007 | Dryden | 705/35 |
| 2008/0052213 | A1* | 2/2008 | Bell | 705/36 R |
| 2008/0071667 | A1* | 3/2008 | Himmelstein | 705/37 |

OTHER PUBLICATIONS

Deferred Exchanges—IRS Issues Proposed Rules for Escrow and Settlement Funds, Morris and Kahen, New York Law Journal, Feb. 24, 1999.*

Sample Business Contracts, Red Hat Software, Incentive Stock Option Agreement, 1998.*

Cashless Exercise of Nonqualified Stock Options, Fairmark, 2002.*

Escrow: a healthy alternative, Fulkerson, C., Alaska Business Monthly, Jul. 1, 1993, from allbusiness.com.*

Employee stock option exercises An empirical Analysis, Huddert, S., Lang, M., Jounral of Accouinting and Economics (21) 5-43, 1996.*

Stock Option Agreement, Immersion Corporation, 2000.*

Stock Options Stock Swapping, Raymond James.*

Affiliate Stkhldrs of Morgan Stanley Dean Witter Discover&Co, et al. , SC 13D/A , Morgan Stanley, Jul. 23, 2001.*

Credit Suisse First Boston Usa Inc., SC 131D/A, Sunrise Senior Living, Nov. 5, 1996.*

FDIC Regulation T, Aug. 16, 2000 version.*

Sarbanes-Oxley Should Not Preclude All Broker-Assisted Cashless Option Exercises by Insiders, Barnes, J., Winter, N., Morris, R., Findlaw, Aug. 28, 2002.*

Microsoft Press, "Microsoft® Computer Dictionary, Fifth Edition"; May 1, 2002; pp. 537.*

RiskInstitue.ch "Sources of Risk, Overview: Settlement Risk", Published May 2000 pp. 1-5.*

"Exercising Stock Options", Dec. 5, 2003, Available on Fidelity.com and Archived by Archive.org.*

Written Opinion of the International Searching Authority, date of mailing Dec. 18, 2006 (3 total pages).

Notification Concerning Submission or Transmittal of Priority Document, date of mailing Mar. 31, 2005 (2 total pages).

Notification of Transmittal of International Preliminary Report on Patentability, date of mailing Jun. 17, 2008 (4 total pages).

"Sarbanes-Oxley Section 402: The Prohibition of Extensions of Credit to Directors and Executive Officer s; Cashless Exercises," *Vinson & Elkins Corporate Governance & Compliance Bulletin*, Bulletin No. 3, Aug. 23, 2002.

*Sarbanes-Oxley Act of 2002—Immediate Prohibition on Personal Loans to Executives*, Sidley Austin Brown & Wood and Affiliated Partnerships, Aug. 6, 2002.

12 CFR 220.3, retrieved from http://ecfr.gpoaccess.gov, on Oct. 17, 2011.

* cited by examiner

METHODS AND SYSTEMS FOR EXERCISING STOCK OPTIONS

CROSS-REFERENCE TO RELATED APPLICATIONS

This application claims the benefit of U.S. Provisional Application No. 60/542,504, filed Feb. 6, 2004, entitled METHODS FOR SAME DAY SETTLEMENT OF STOCK OPTIONS.

BACKGROUND OF THE INVENTION

The present invention generally relates to employee stock option plans. Particularly, the present invention relates to computer systems and methods for exercising and settling stock options.

A number of employers, e.g., companies, offer compensation and benefits to their employees via employee stock benefit plans, such as an employee stock option plan ("ESOP"), employee stock purchase plan ("ESPP"), restricted stock agreement plan ("RSA"), etc. Stock plans provide a variety of benefits for both the employer and employee. Employers, for instance, may benefit with increased tax savings, cash flow, and productivity, and employees granted a stake in the company therewith are able to share in the company's success. An employee stock option is generally a contractual right granted to an employee or employees that give employees the option to purchase company stock during a specified period at a predetermined price. An ESPP similarly allows employees to purchase company stock, however, rather than at a predetermined price, the employee usually purchases the stock at a discounted price. Under a restricted stock agreement, the company generally grants company stock to an employee subject to specific vesting and transfer restrictions.

Generally, when an employee, such as a company executive, decides to exercise the option, the employee must make the appropriate arrangements to fund the purchase. For example, assume company XYZ gives employee A an option to purchase 1,000 shares of company stock at $100/share. Assume further that employee A decides to exercise the option at some later time when the stock is trading at $200 a share. To do so, employee A must pay the option price of $100,000 to the employer for the company stock. The employee may sell the stock at market price to realize the profit from the sale. Certain companies prohibit cashless exercises of stock options for executives and officers of the company because they construe such market transaction to be an extension of credit or an arrangement for an extension of credit under section 402 of the Sarbanes Oxley Act of 2002. Exercising such stock options may therefore prove to be burdensome for some individuals and/or may be time consuming insofar as the employee must make alternate financing arrangements for the purchase. Accordingly, in this respect, there is a need for improved methods and systems for exercising stock options.

SUMMARY OF THE INVENTION

The present invention generally provides methods and systems, e.g., computer implemented and computer systems, for exercising stock options. In one aspect of the invention, a method for a stock option exercise of an employee stock option, provided to an employee by a company, is provided that is accomplished by:

establishing a plurality of escrow accounts comprising a company escrow account, a third party escrow account, and an employee escrow account;

receiving notice of an employee intent to exercise a stock option;

transferring securities to satisfy the stock option exercise from the company to a company escrow account;

transferring property equivalent to a third party purchase price from a third party to the third party escrow account;

transferring the notice of intent to exercise a stock option to the employee escrow account; and transferring property held in the plurality of escrow accounts to the employee, the company, and the third party in accordance at least in part with the stock option being exercised. At least one step of the method is preferably accomplished by at least one computing device.

In another aspect of the invention, a method for a stock option exercise of an employee stock option between an employee and a company is provided that includes the steps of:

establishing a plurality of escrow accounts comprising a company escrow account, a third party escrow account, and an employee escrow account;

receiving notice of an employee intent to exercise a stock option;

communicating a request for a quote for a purchase of the securities to satisfy the stock option exercise to a third party;

transferring securities to satisfy the stock option exercise from the company to a company escrow account;

transferring property equivalent to a third party purchase price from the third party to the third party escrow account;

transferring the notice of intent to exercise a stock option to the employee escrow account; and transferring property held in the plurality of escrow accounts essentially simultaneously to the employee, the company, and the third party in accordance at least in part with the stock option being exercised. In this instance the securities held in the company escrow account are transferred to the third party, property equivalent to an option price is transferred to the company, and property equivalent to net proceeds from a sale of the securities is transferred to the employee.

In another aspect of the invention, a system is provided that includes at least one computing device having software associated therewith that when executed performs a method for exercising employee stock options. The method includes the steps of establishing a plurality of escrow accounts including:

a company escrow account that includes securities transferred thereto to satisfy an exercise of at least one employee stock option;

a third party escrow account that includes property equivalent to a third party purchase price transferred thereto for the purchase of the securities and for the receipt of the securities; and an employee escrow account that includes a notice of intent to exercise the stock option and for the receipt of net proceeds from a sale of the securities;

receiving the notice of intent to sell the securities;

transferring the securities from the company escrow account to the third party escrow account;

transferring property equivalent to the third party purchase price appropriately apportioned to the employee escrow account and the company escrow account; and transferring the notice of intent to at least one of the company and the third party. In this instance, the property transfers occur essentially simultaneously.

Additional aspects of the present invention will be apparent in view of the description which follows.

BRIEF DESCRIPTION OF THE FIGURES

The invention is illustrated in the figures of the accompanying drawings, which are meant to be exemplary and not limiting, in which like references refer to like or corresponding parts, and in which.

DETAILED DESCRIPTION OF PREFERRED EMBODIMENTS

The present invention generally provides novel methods and systems to facilitate stock option exercises. The invention is beneficially applicable for stock options provided by companies that do not allow cashless exercises for employees, such as for executives and officers of the company insofar as doing so may be viewed as extending credit to or arranging credit in the form of a personal loan to the employees for the employees to exercise their options. This aspect of the invention is generally achieved by selling the securities due the employee under the stock option to a third party and transferring the proceeds from the sale of the securities to the parties of the stock option, e.g., the employee and the company, thereby allowing the employee to exercise the stock option without outlaying any funds and obviating the need for the company to tender the securities to the employee after a market transaction has been placed. In one embodiment, a plurality of escrow accounts are provided for holding the property, e.g., the securities and property representing or otherwise equivalent to the purchase price, temporarily to facilitate transfer between the parties in a timely manner, such as essentially simultaneously.

In one embodiment, a stock option is exercised and settled in less time than. would normally be accomplished with a traditional settlement cycle, such as in less than three days, or more preferably less than one day, or even more preferably on the same day or even essentially simultaneously. That is, the actual sale and settlement of the stock option occur within this abbreviated period. This aspect of the invention is at least in part available in instances where the property due the respective parties to the stock option exercise according to the present invention as a result of the exercise are transferred essentially simultaneously. The simultaneous transfer may further diminish the notion that the exercise involves the employer extending or arranging credit for the employee. In other embodiments, abbreviated exercise and settlement is accomplished with a fast paced procedure that includes deadlines for transferring and/or communicating the property and/or documents to the respective accounts/entity.

Although the present invention may be described by way of example in relation to certain types of stock option plans and in relation to certain types of securities, such as company stock, it is understood that the present invention is generally applicable to all types of stock option plans, such as employee stock purchase plans, restricted stock agreement plans, etc., and to all types of securities, such as options, warrants, etc., and is thus not limited thereto. Additionally, although the present invention may be described as occurring in a particular manner, e.g., manually, electronically, or a combination thereof, it is similarly understood that the present invention is also not limited thereto.

Stock option exercises generally involve communicating or otherwise transferring information, documents, property, or a combination thereof between the parties to the stock option. The term property is generally used herein to denote an item having a value that may be transferred to satisfy a sale of securities. Property therefore includes, but is not limited to money, chattel, real property, securities, etc. The term transfer is generally used herein to denote any type of conveyance, including a physical transfer or a non-physical transfer, such as by updating an account to indicate that the property has been included therein. In one aspect of the invention, a system is established, which includes a plurality of accounts and procedures for the transfer of information, documentation, or property, in order to facilitate cashless stock option exercises in accordance with the present invention.

Figure 1:
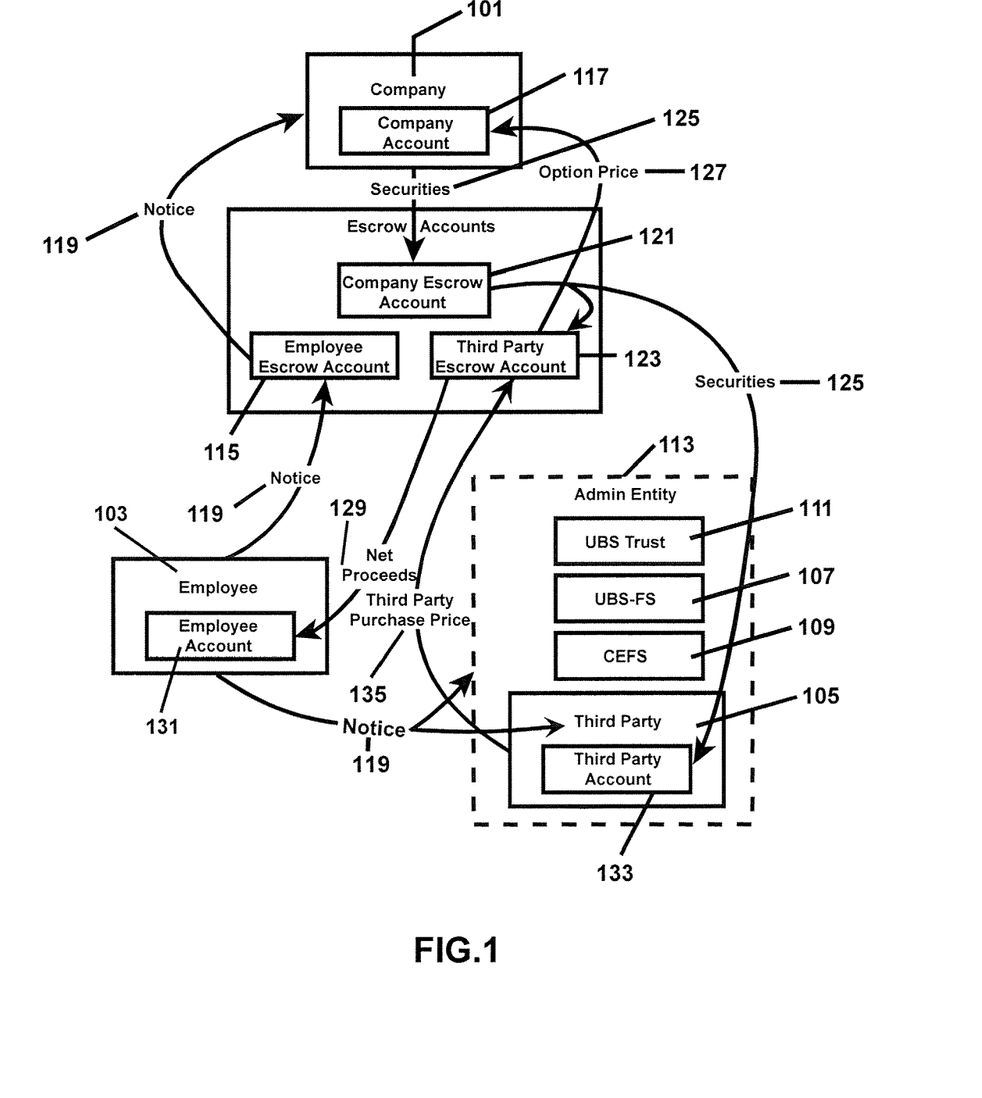
FIG. 1 is a block diagram showing property and/or document transfers and information communication, respectively, between the parties for exercising stock options according to one embodiment of the invention.

Referring to FIG. 1 the parties to stock option exercises according to the present invention include at least one company 101, at least one employee 103, and at least one third party 105. The company 101 is generally a party that offers or otherwise provides the stock option for an employee 103, which option typically allows the receiving party to purchase a predetermined amount of securities, e.g., in the company 101, at a predetermined price and/or at a predetermined time. The company 101 can be any type of entity, including a business, a corporation, a partnership, etc. The employee 103 is generally a party that receives the stock option and has the authority to exercise the option at the predetermined price and/or time. The third party 105, such as UBS Securities, is a party that purchases the securities due to the employee 103 under the stock option exercise.

In addition to the parties of the stock option and the third parties, one or a number of individuals/entities may be involved in administering accounts and/or executing more steps of the present invention. For example, an entity, such as UBS Financial Services ("UBS-FS") 107, or a department of the entity, such as Corporate Employee Financial Services ("CEFS") 109, may administer the overall process, and an entity, such as UBS Trust 111, may administer escrow accounts for the transfer of property between the parties and may serve as an agent for the accounts, an entity, such as UBS-FS 107, may administer non-escrow or retail accounts for the parties, such as money market accounts, securities accounts, etc. It is understood that the roles of the parties described herein, including that of the third party and the administering entities 113, may be accomplished by a single entity or a single entity with one or more affiliates. Accordingly, although the invention may be described in relation to a number of entities, the invention is not limited thereto.

In instances where the employee 103 chooses to exercise a stock option and purchase securities due thereto at the option price directly from the company 101, property, e.g., money, equivalent to the option price of the securities (exercise price per security * number of securities) may be transferred from the employee 103 to the company 101 and the securities may subsequently be transferred from the company 101 to the employee 103. The property transfers may occur in a variety of ways, including electronically, manually, or a combination thereof. For example, each of the parties may have a retail account(s) with one or more financial service companies, such as UBS-FS 107, which track the parties' property deposited therewith, such as cash, securities, etc. In this instant, the employee may instruct the financial service company to transfer, e.g., via wire transfer, the option price of the securities from an employee account 115 to a company account 117. Similarly, the company may instruct the financial service company to transfer company securities to the employee 103, e.g., electronically via Depository Trust Company ("DTC"), once the option price has been received. In either event, the parties' accounts will be updated to reflect the transfer. With respect to the example above, the employee may wire the $100,000 option price from an employee account 113 to a company account 117 and the company may then transfer 1,000 shares of company stock to an employee account 115.

In instances where the employee 103 chooses an exercise in accordance with the present invention, a notice of an employee intent 119 to exercise the stock option is communicated to the company 101, a third party 105, an administrating entity 113, or a combination thereof, the company 101 transfers company securities 125 to a company escrow account 121, and the third party purchaser of the securities transfers a third party purchase price 135 (the price agreed upon for the securities by the employee and the third party) to a third party escrow account 123. The notice may be communicated in any documentary format including hard copy or electronic format, using any communication medium, such as personally, telephone, fax, electronically, e.g., email, through a web site, etc. In one embodiment, the notice of intent to exercise is transferred to and held in an employee escrow account. Once the formalities of the exercise have been completed, the option price 127 is transferred to the company 101, the net proceeds 129 from the exercise (third party purchase price—option price—(taxes and fees)) are transferred to an employee account 115, and the securities 125 are transferred to the third party 105. The notice of intent 119 may also be transferred to the company 101 and/or third party 105 from the employee escrow account 115. In one embodiment, the transfers occur essentially simultaneously. Further with respect to the above example, assuming the employee 103 and the third party 105 agree to a $200/share purchase price, in order for the cashless exercise to occur, the third party 105 will transfer $200,000 to a third party escrow account 123 and the company 101 will transfer 1,000 shares of company securities 125 to another escrow account, a company escrow account 121. Upon exercise, the option price 127 of $100,000 transfers to a company account 117, the net proceeds 129 of $100,000 transfers to an employee account 131, and 1,000 shares of company securities 125 are transferred to a third party account 133. The transfers preferably occur essentially simultaneously.

Figure 2:
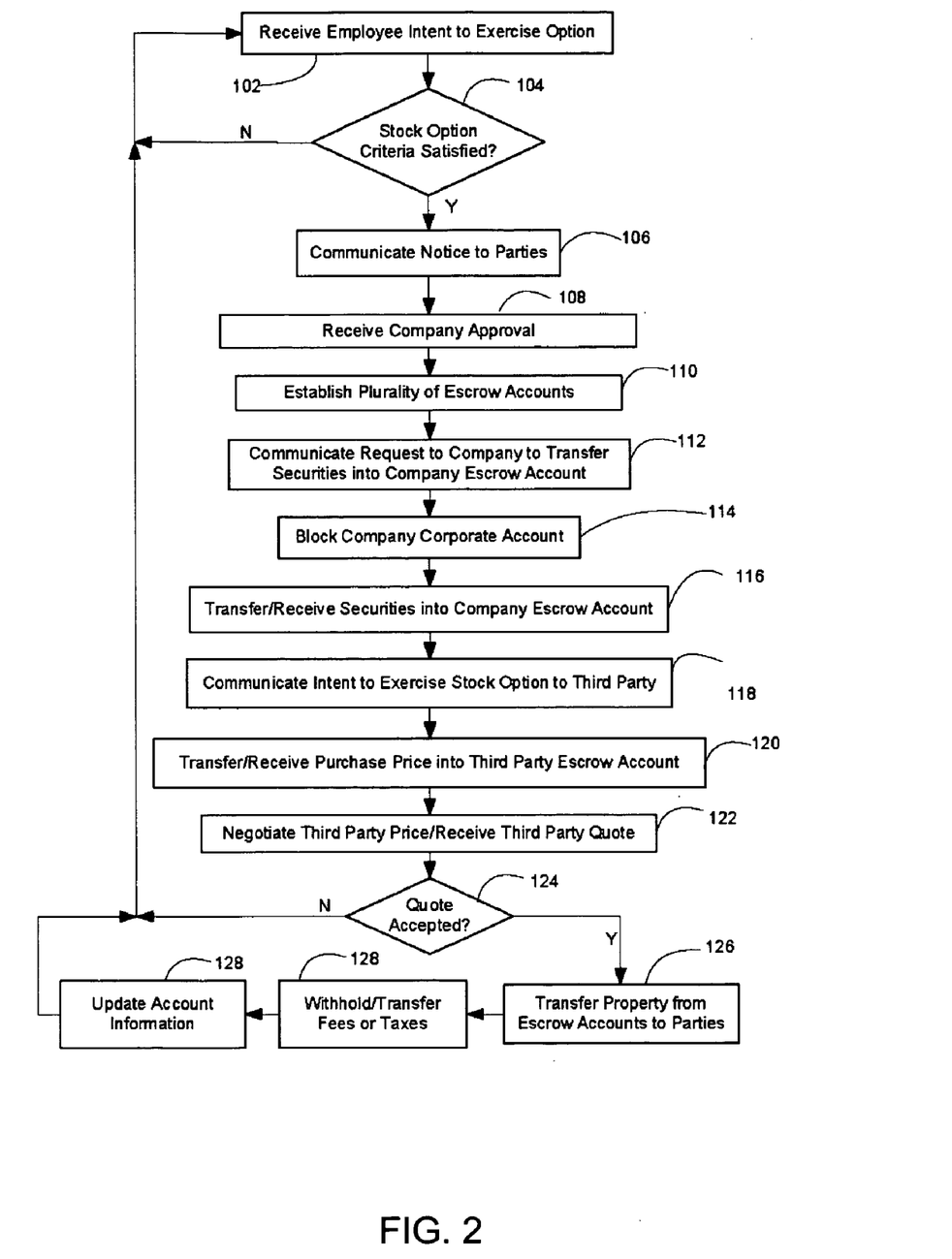
FIG. 2 is a block diagram of a method for exercising stock options according to one embodiment of the invention.

Referring to FIG. 2, a method for exercising stock options according to one embodiment of the invention begins with the employee communicating, and the relevant party or parties receiving, a notice of intent to exercise stock option, step 102. As a preliminary matter, the employee, the company, and at least one third party have established at least one account such as an employee retail account, a company corporate account, a third party retail account, accompany corporate account, a third party retail account, etc., for tracking property transfers in accordance with the exercise of the present invention. The accounts may be maintained with more than one financial service entity or preferably with one financial service company, such as with UBS-FS 107. In one embodiment, at least one employee stock plan is administered using a stock plan administration system, such as that described in U.S. patent application Ser. No. 10/718,883, entitled "Employee Stock Plan Administration System and Methods," which is hereby incorporated herein by reference. In this respect, the notice of intent to exercise the stock option plan may be communicated to an entity that administers the stock plan for the company, such as UBS-FS 107.

At some time prior to receiving the notice of intent to exercise a stock option, the parties to the stock option, e.g., the employee and the company, may have established or participate in a system for the exercise of stock options in accordance with the present invention. In this respect, an administrating entity receives and maintains information relevant for exercising the stock option, such as the terms of the stock option, e.g., the identification ("ID") and the type of security, the number of securities, the option price/security, any vesting information, etc., exercising employee information, e.g., name, address, tax ID number, employee account information, employment start date, etc., company information, e.g., company name, address, tax ID number, company account information, etc. The administering entity may also maintain information regarding at least one third party, such as third party name, address, tax information, account information, etc. In one embodiment, the information is maintained in at least one database associated with a computing system, such as the computing system described below in relation to FIG. 3.

The intent to exercise a stock option may then be tested against the terms of stock option, step 104. This may be accomplished in a variety of ways given the diversity of stock option plans. For instance, where the stock plan includes certain vesting requirements, a determination may be made as to whether the vesting requirements have been satisfied. For example, if the stock plan requires that the employee must be employed with the company for at least 5 years, a determination will be made against the information maintained for the stock option, the company, and/or the employee, such as information regarding the date the employee began employment with the company. If the testing criteria are not satisfied, the request may be rejected and subsequent requests may similarly be received and tested. If the testing criteria are satisfied, the notice may then be sent to the company and/or a third party, step 106.

A plurality of escrow accounts may be established for holding the property to facilitate the transfer of property for the exercise of the stock option, step 110. The escrow accounts may be established at any time prior to the transfer at closing. For instance, the escrow accounts may be established in anticipation of a transfer either at the inception of the stock option, at the time notice of intent to exercise a stock option is received or soon thereafter, or at any time in between. In one embodiment, the escrow accounts are established when the notice of intent is received by the administering entity. In another embodiment, three escrow accounts are established, an employee escrow account, a company escrow account, and a third party escrow account. The employee escrow account generally holds property, such as the notice of intent, for the benefit of the employee. The company escrow account holds property, such as the securities due under the stock option, for the benefit of the company. The third party escrow account holds property, such as the third party purchase price, for the benefit of the third party purchaser of the securities. In one embodiment, the escrow accounts are established only after the company at least preliminary approves the exercise, step 108.

Once the escrow accounts have been established, a request to transfer the securities pursuant to or that otherwise satisfy the stock option exercise is communicated to the company, step 112. This step may be accomplished in a variety of ways, including by telephone, mail, electronically, etc. In one embodiment, the company account or accounts are blocked temporarily pending transfer of the securities and/or settlement of the stock option exercise, step 114. The company may then transfer the securities to the company escrow account, step 116. The securities will generally be held in the escrow account until the securities are transferred to the employee or the employee terminates the exercise.

The notice of intent to trade may then be communicated to a third party purchaser, step 118. In certain embodiment, the notice of intent serves as a request for a quote ("RFQ"). The third party purchaser may be any individual or entity. In one embodiment, the third party purchaser is also the administering entity or an affiliate of the administering entity. The third party purchaser generally agrees to purchase the securities due the employee under the stock option at a third party purchase price, which may be any agreed upon price including the market price at the time of the exercise. In one embodiment, the third party transfers property, such as cash, equivalent to the third party purchase price into the third party escrow account, step 120, which will similarly be held therein until the purchase price is appropriately transferred to the parties of the stock option (closing) or until the employee terminates the exercise.

The purchase price may be negotiated between the employee and the third party, step 122, either before or after property is transferred to the third party escrow account. If the purchase price is negotiated prior to the transfer of the property to third party escrow account then property equivalent to a known purchase price is transferred to third party escrow account. For instance, with respect to the above example, assuming the employee and the third party agree to $200 per share for 1,000 shares of company stock then the third party must transfer at least $200,000 into the escrow account. If the purchase price is negotiated after the transfer then property equivalent to an anticipated purchase price may be transferred to the escrow account. The anticipated purchase price is generally based on the market price of the security at the time of transfer, which price may include an additional amount to account for risks to the third party, e.g., fluctuations in the market price. For example, assuming the market price for the company stock is $210 and the stock typically fluctuates ±$5 on a trading day, then the third party should transfer $215,000 to the escrow account.

Once the purchase price has been accepted by the employee, step 124, assuming any conditions have been satisfied, such as successful transfer of the necessary property into the escrow accounts or of the documents necessary to the relevant party/entity, the property in the plurality of escrow accounts may then be transferred to the respective parties' account or accounts in accordance at least in part with the stock option, step 126. The property may be transferred to the parties' retail or corporate accounts or between the escrow accounts. In one embodiment, the property in each of the plurality of escrow accounts is transferred essentially simultaneously to the respective accounts. In this respect, the securities 125 held in the company escrow account 121 are transferred to the third party escrow 123 or the third party account 133, the net proceeds 129 of the third party purchase price 135 are transferred to the employee account 131 from the sale of securities from the company escrow 121 or retail/corporate accounts, and the notice 119 of intent to either the company 101, the third party 105, an administering entity 113, or a combination thereof.

The third party purchase price is generally apportioned appropriately between the employee and the company so that the company receives the option price in accordance with the terms of the stock option and the employee receives the net proceeds from the sale, e.g., the third party purchase price less the stock option price. Taxes and fees may also be either withheld in connection with the transfer or debited from the employee and company accounts, step 128. Property transferred between escrow accounts may later be transferred to the parties' retail or corporate accounts. The information relating to the exercise may then be updated accordingly to reflect the exercise, step 130.

EXAMPLE

In one embodiment, the roles of the parties, such as the roles of an administering entity ("CEFS"), an entity that administers trust accounts ("UBS Trust"), and a third party ("UBS Securities"), with regard to facilitating stock option exercises and/or same day settlement for employees, such as executives, that exercise options in accordance with the present invention are as follows:

CEFS (Corporate Employee Financial Services A Department of UBS-FS

A. CEFS generally oversees the operation of the process.
  1. CEFS ensures that a plurality of escrow accounts, preferably three escrow accounts, are set up with the entity that administers non-trust accounts (UBS-Financial Services or UBS-FS) in the UBS Trust account number range and titled:
    a. UBS Fiduciary Trust Company for the benefit of UBS Securities (third party or "UBS Securities Escrow Account");
    b. UBS Fiduciary Trust Company for the benefit of the Company ("Company Escrow Account");
    c. UBS Fiduciary Trust Company for the benefit of the Employee ("Employee Account").
  2. CEFS also ensures that duplicate statements and confirmations will be sent to UBS 30 Trust for each of the escrow accounts, including duplicate confirmation of the stock option exercise advice.
  3. CEFS also notify UBS Trust, such as by phone or by any other means, including electronically, by mail, etc., or a combination thereof, of the intent of the employee to trade and send the exercise notice to UBS Trust.
  4. Obtain Transfer Agent letter.
  5. Block the optionee's account.
  6. Notify UBS securities by phone of the employee's preliminary intent to trade.
  7. Ensure that shares have been received by the company escrow account by street name (symbol) and provide evidence of delivery to UBS Trust.
  8. Ensure delivery of the third party purchase price via fed funds wire from UBS securities to UBS securities escrow account. The amount of the wire should overfund the sale to allow for rising market conditions. Provide evidence to UBS Trust of delivery of the purchase price to the UBS securities escrow account.
  9. If the employee does not trade, the escrow shares must be returned to the transfer agent. (NB: same day settlement transactions are note expected to involve legended shares, but if these procedures are modified to allow for same day settlement of restricted shares, the transfer agent should be instructed to retire restrictive legends to any unsold shares.)
  10. Process a sale in the employee escrow accounts.
  11. Process a buy in the UBS Securities Escrow Account. The sale should be marked DNE ("Discretion Not Exercised").

12. Transfer options costs and taxes from employee escrow account to the company's retail omnibus account at UBS-FS for its stock option program.

13. Transfer remaining proceeds of sale due to employee to the employee's retail account at UBS-FS.

14. Instruct clearance and settlement area to deliver the positions to the UBS Securities Escrow Account via DTC.

15. Make a journal entry of unsold shares from the company escrow account to the corporate client retail account.

16. Make a journal entry of options costs and taxes from the employee's retail account to the corporate client retail account for the cash exercise portion.

17. Make a journal entry of cash exercises shares from the corporate client retail account to the employees' retail account (if applicable).

18. Fax the UBS Trust a copy of the administering package exercise confirmation.

19. On (T+1) UBS-FS should check all accounts involved in the transaction the previous day to ensure all journals were run correctly.

B. CEFS legal

1. CEFS Legal generally receives the required signed documents, such as:
   a. Master Service Agreement—UBS-FS, UBS Trust, UBS Securities
   b. Statement of Work—UBS-FS, UBS Trust, UBS Securities
   c. Schedule 1—Company, UBS-FS
   d. Appendix 1—Employee, Company
   e. Exercise Notice—Employee, Company
   f. Escrow Application—Employee
   g. Legal Documents
      i. UBS Securities Escrow—UBS Securities
      ii. Company Escrow—Company
      iii. Employee Escrow—Employee
      iv. Employee Retail—Employee
   h. Obtain information regarding the customer identification program for the escrow accounts.
   i. Send the documents (forms), such as the agreements, escrow application, etc., to UBS Trust.

C. CEFS Administration

1. CEFS administration generally produce a transfer agent letter within 15 minutes of receiving notification from operations that a letter of intent has been received.

2. If executive does not trade, a transfer agent letter for a reverse DWAC
   (Deposit/Withdrawal at Custodian) is produced.

3. Update admin package with the exercise and sale; computes option costs, and taxes within 15 minutes of execution.

D. Call Center/Financial Advisor

1. Call center/financial advisor receives the following documents completed and signed:
   a. Rule 144 Paperwork
   b. Form 144 (3 presigned)
   c. 144 Seller's Rep Letter
   d. Verbal Checklist 2. Financial advisor obtains OK to sell from specialized and restricted securities dept.

3. Contacts the executive with the current price provided by the UBS Securities.

4. The call center initiates conference calls as follows for the purpose of UBS Securities quoting a purchase price and Employee accepting the purchase price.
   a. UBS Trust, UBS Securities, and Employee or Employee's agent authorized in the Escrow Agreement; or
   b. Separate simultaneous conference calls with:
      i. UBS Trust and UBS Securities
      ii. UBS Trust and Employee or Employee's agent
      c. Financial Advisor, if any involved, may listen to the call.

E. UBS Trust

1. UBS Trust establishes three escrow accounts.

2. Verify with UBS FS that the escrow shares have been derived to the company escrow account.

3. Verify with UBS-FS that the escrow amount has been delivered to the UBS Securities escrow account.

4. Verify receipt of the employee's exercise notice.

5. Hold escrow shares, escrow amount, and exercise notice in escrow for the benefit of the company, UBS Securities, and the employee respectively until the closing.

6. Participate in conference call(s) and if it determines that the escrow shares, escrow amount, and the exercise notice have been received that the employee and UBS Securities agree on the terms of a sale transaction, declare the closing to occur.

7. Direct UBS-FS to effect the necessary transfers to deliver the proper number of shares and the proper amounts for exercise costs, fees, taxes, and proceeds to the proper post-closing owner.

F. UBS Securities

1. UBS Securities completes and signs documents.

2. Quotes purchase price during the conference call(s) to the employee and US
Financial Services for, e.g., the same day settlement of funds.

3. Deliver an amount at least equal to the purchase price (which should be higher than the purchase price based on the current bid to allow for some increase in the market price) to the UBS Securities escrow account.

4. Allow for the sale of shares to UBS Securities to process through DTC. G. Company 1. The company provides transfer agent letter on (T−1) to ensure delivery of shares on (T+0).

2. Complete and sign required documents.

H. Employee

1. The employee completes and signs the required documents.

2. Participates in Conference call, personally or through an agent, and accepts or rejects the purchase price quote from UBS Securities.

In one embodiment, stock options are exercised in accordance with the following timeline, which identifies the appropriate cut-off time for each function to facilitate same day settlement for option exercise:

I Trade Date—1 (T−1)
   A By 11:00 a.m. ET—Executive has given notice of intent to trade in a same day settlement environment including all required documents. The notice may be revocable. CEFS operations logs the Intent to trade and forward the information to CEFS' plan administration department. UBS-FS notifies UBS Trust of intent to trade and delivers the Exercise Notice to be held in Escrow.
   B By 11:15 a.m. ET—CEFS plan admin. department contacts the company client, creates the Transfer Agent letter, and returns the paperwork to CEFS operations. CEFS operations requests delivery of shares from the Transfer Agent to escrow account at UBS-FS in the name of the UBS Trust f/b/o company. CEFS operations open a STAR case to Security Allocation Department to ensure shares are received. They should be received by 4:00 a.m. on T−1, but no later than 10:00 a.m. on the trade date.
   C By 4:00 p.m. ET—UBS Executive Services desk obtains preauthorization for transactions as required in conjunction with rule 144 procedures of Specialized and Restricted Securities Department. Some exercises may require corporate client approval.

D 4:00 p.m. ET—CEFS [Operations] blocks the optionee's (company) account.

E 4:00 p.m. ET—CEFS [Operations] contacts UBS securities with the intent to trade.

II Trade Date

A After 9:45 a.m. ET—UBS-FS verifies unrestricted share in Street Name have been received from transfer agent into the company escrow account. If not, escalate to company/corporate client.

B By 11:00 a.m. ET—UBS Securities deposits funds into UBS Securities escrow account ready for the transaction.

C 11:00 a.m. ET—Conference call(s) occur. UBS Securities quotes a third party purchase price; employee or authorized agent accepts or rejects the quote.

D By 12:15 p.m. ET—
 1 UBS-FS communicates trade information to Plan Administration Dept.
 2 CEFS' Admin. Dept. enters exercise information into admin. package and produces settlement work for CEFS operations.
 3 UBS-FS computes and transfers option cost and taxes from account in the name of UBS Trust to corporate omnibus account.
 4 Transfer net proceeds from account in name of UBS Trust to employee's account.

E 12:30 p.m. ET—
 1 UBS-FS instructs the clearance and settlement area to delivery the position and debit to the UBS Securities account via the automated DTC process.
 2 UBS-FS journals funds from the UBS Securities account back the general ledger account.
 3 UBS-FS unblocks the employee account.

F By 3:00 p.m. ET—UBS-FS faxes UBS Trust a copy of the Admin. package exercise information.

III Trade Date+1

9:00 a.m. ET—UBS-FS checks all accounts involved in the transaction the previous day to ensure all journals were run correctly.

The notice may be communicated in a variety of ways, such as personally, by telephone, by fax, electronically, etc. The employee may communicate the notice electronically, for example, with an email or with a web site that includes therein form elements for the employee to indicate that the employee is giving such notice. The web site, for instance, may provide the employee with access to the employee account.

Figure 3:
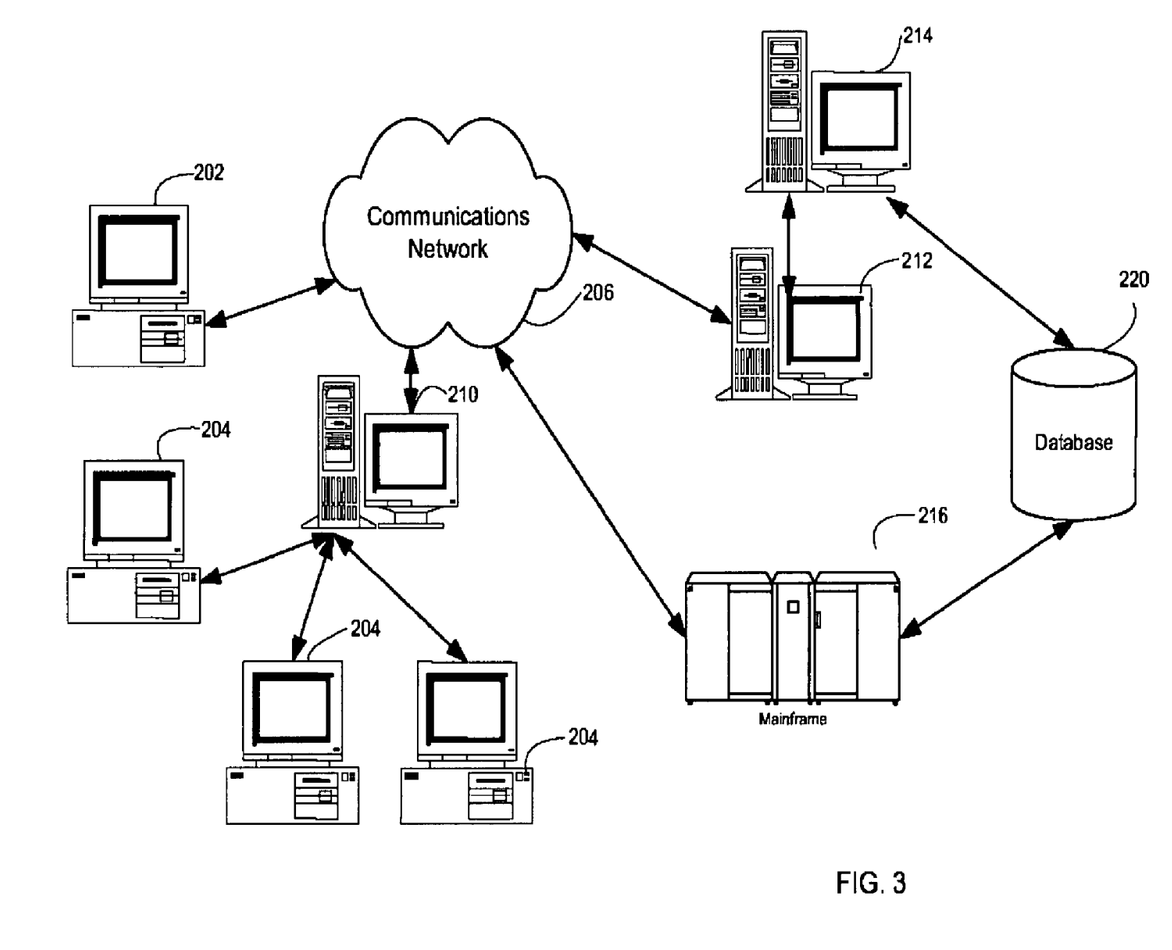
FIG. 3 is a block diagram of a computer system for exercising stock options according to one embodiment of the invention.

Referring to FIG. 3, in one embodiment of the invention, a system for exercising stock options is provided that includes at least one computing device 202, 204, 214 which has software associated therewith, e.g., stored on a computer readable medium, such as a hard drive, tape drive, optical media, magnetic media, etc., that when executed performs or enables a user to perform at least one of the steps of the method for exercising stock option as discussed above. In one embodiment, a client computing device 204, 202 is connected over a communication network 206 to at least one server computer, such as proxy server 212, and/or an application server or servers 214, or any other type of host computer, having at least one database associated therewith, such as database 220. The computing devices 204 may further be connected to the servers 212, 214 though a proxy server 210.

The communications network 206 is any suitable communications link, such as a local area network (LAN), wide area network (WAN), the Internet, a wireless network, or any combinations thereof. A computing device 202, 204 is generally a multipurpose computer having a processor and memory that is capable of communicating with the server computers 210, 212, 214 and also capable of displaying information received therefrom. A computing device may therefore be a personal computer (PC), special purpose computer, a workstation, a wireless device, such as personal digital assistants (PDA), cellular phones, two-way pagers, etc. The computing device 202 for instance, may be a terminal for use by an employee, or company, third party, or administering entity personnel, etc. The database 220 generally includes therein information or data regarding the accounts and the parties described above.

The client computing device 202, 204 generally provides an interface for a party of the stock option or a person associated with the administering entity/third party to perform certain function in relation to the stock option and/or any one of the party accounts. The interface may be provided with a standalone client computing device (not shown) or in with a client computing device 202, 204 in combination with the server computer. For example, the server computer may provide the back end functionality for computing device 202, 204. That is, the server computer causes a graphic user interface ("GUI") to be displayed at a computing device 202, 204, which GUI may provide information regarding stock options, such as the details of particular options, e.g., the party entitled to exercise an option, vesting data, the exercise price, number of securities, the type and/or name of the security, etc., for the user. A GUI may also be displayed that provides access to information regarding the parties' accounts, such as the employee account, the company account, the third party account, escrow accounts, etc., as noted above.

GUIs may also be displayed that allow the user to communicate information to other system users. For example, an interface may be displayed that includes therein at least one form element therein for a user to communicate a document or message to an employee, the company, a third party, an administering entity, etc. Various documents may be communicated, including applications, the intent to exercise a stock option, quotes for stock option securities, acceptance or rejection of the quotes, requests to transfer property between accounts, etc. In addition to the interface functionality, the system may also be used to transfer property electronically, such as wire transfer, DTC, etc.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer implemented method for exercising employee stock option provided by a company, comprising:
 receiving notice of an employee intent to exercise an employee stock option having an option price;
 establishing a company escrow account and a third party escrow account in a database;
 transferring, by a server computer, property equivalent to a third party purchase price to the third party escrow account;
 transferring, by the server computer, the securities to satisfy the employee stock option to the company escrow account;
 exercising the employee stock option by the server computer, wherein exercising includes transferring the property equivalent to the option price of the employee stock option from the third party escrow account to the company and the securities to satisfy the employee stock option from the company escrow account to the third party; and transferring, by the server computer, net proceeds from the exercise of the employee stock option from the third party escrow account to the employee;

wherein the third party purchase price is an anticipated purchase price-based at least in part on a market price for the securities at the time of transfer, the anticipated purchase price including an additional amount to account for fluctuations in the market price.

2. The method of claim 1, further comprising establishing the third party escrow account and the company escrow account in response to receipt of the notice of intent by the server computer.

3. The method of claim 1, further comprising communicating a request, by the server computer, to at least one third party for a quote for purchasing the securities to satisfy the stock option exercise.

4. The method of claim 3, further comprising receiving, by the server computer, a response from the third party that indicates an agreement to purchase the securities to satisfy the option at the third party purchase price.

5. The method of claim 1, wherein the step of transferring the property equivalent to the option price of the employee stock option from the third party escrow account to the company comprises transferring the property to the company escrow account or another company account.

6. The method of claim 1, wherein the step of transferring the securities to satisfy the employee stock option from the company escrow account to the third party comprises transferring the securities to the third party escrow account or another third party account.

7. The method of claim 1, wherein the step of transferring the net proceeds from the exercise of the employee stock option from the third party escrow account to the employee comprises transferring the net proceeds to an employee escrow account or another employee account.

8. A computer system for exercising employee stock options provided by a company comprising:
a server computer and a database for exercising an employee stock option having an option price;
the server computer configured to transfer property equivalent to the third party purchase price to a third party escrow account established in the database;
the server computer configured to transfer the securities to satisfy the employee stock option to a company escrow account established in the database;
the server computer configured to exercise the employee stock option, wherein the exercise includes transferring the property equivalent to the option price from the third party escrow account to the company and the securities to satisfy the employee stock option from the company escrow account to the third party; and
the server computer configured to transfer net proceeds from the exercise of the employee stock option from the third party escrow account to the employee;
wherein the third party purchase price is an anticipated purchase price based at least in part on a market price for the securities at the time of transfer, the anticipated purchase price including an additional amount to account for fluctuations in the market price.

9. The computer system of claim 8, wherein the server computer is further configured to establish the third party escrow account and the company escrow account in response to receipt of the notice of intent.

10. The computer system of claim 8, wherein the server computer is further configured to communicate a request for a quote for purchasing the securities to satisfy the stock option exercise to at least one third party.

11. The computer system of claim 10, wherein the server computer is further configured to receive a response from the third party that indicates an agreement to purchase the securities to satisfy the option at the third party purchase price.

12. The computer system of claim 8, wherein the server computer is further configured to transfer the property equivalent to the option price of the employee stock option from the third party escrow account to the company escrow account or another company account.

13. The computer system of claim 8, wherein the server computer is further configured to transfer the securities to satisfy the employee stock option from the company escrow account to the third party escrow account or another third party account.

14. The computer system of claim 8, wherein the server computer is further configured to transfer the net proceeds from the exercise of the employee stock option from the third party escrow account to an employee escrow account or another employee account.

15. A computer implemented method for exercising employee stock options provided by a company, comprising: receiving notice of an employee intent to exercise an employee stock option having an option price; establishing a company escrow account and a third party escrow account in a database; transferring, by a server computer, property equivalent to a third party purchase price to the third party escrow account; transferring, by the server computer, the securities to satisfy the employee stock option to the company escrow account; exercising the employee stock option by the server computer, wherein exercising includes transferring on the same date as a trade date of the securities underlying the employee stock option the property equivalent to the option price of the employee stock option from the third party escrow account to the company and the securities to satisfy the employee stock option from the company escrow account to the third party; and transferring, by the server computer, net proceeds from the exercise of the employee stock option from the third party escrow account to the employee; wherein the third party purchase price is an anticipated purchase price-based at least in part on a market price for the securities at the time of transfer, the anticipated purchase price including an additional amount to account for fluctuations in the market price.

16. The method of claim 15, wherein the step of transferring the property equivalent to the option price of the employee stock option from the third party escrow account to the company comprises transferring the property to the company escrow account or another company account.

17. The method of claim 15, wherein the step of transferring the securities to satisfy the employee stock option from the company escrow account to the third party comprises transferring the securities to the third party escrow account or another third party account.

18. The method of claim 15, wherein the step of transferring the net proceeds from the exercise of the employee stock option from the third party escrow account to the employee comprises transferring the net proceeds to an employee escrow account or another employee account.

19. A computer system for exercising employee stock options provided by a company comprising: a server computer and a database for exercising an employee stock option having an option price; the server computer configured to transfer property equivalent to the third party purchase price to a third party escrow account established in the database; the server computer configured to transfer the securities to satisfy the employee stock option to a company escrow account established in the database; the server computer configured to exercise the employee stock option, wherein the exercise includes transferring on the same date as a trade date of the securities underlying the employee stock option the property equivalent to the option price from the third party escrow account to the company and the securities to satisfy the employee stock option from the company escrow account to the third party; and the server computer configured to transfer net proceeds from the exercise of the employee stock option from the third party escrow account to the employee; wherein the third party purchase price is an anticipated purchase price-based at least in part on a market price for the securities at the time of transfer, the anticipated purchase price including an additional amount to account for fluctuations in the market price.

20. The computer system of claim 19, wherein the server computer is further configured to transfer the property equivalent to the option price of the employee stock option from the third party escrow account to the company escrow account or another company account.

21. The computer system of claim 19, wherein the server computer is further configured to transfer the securities to satisfy the employee stock option from the company escrow account to the third party escrow account or another third party account.

22. The computer system of claim 19, wherein the server computer is further configured to transfer the net proceeds from the exercise of the employee stock option from the third party escrow account to an employee escrow account or another employee account.

* * * * *